United States Patent
Radcliffe

(10) Patent No.: US 6,439,578 B1
(45) Date of Patent: Aug. 27, 2002

(54) SEALING RING COMBINATION

(75) Inventor: Christopher David Radcliffe, Horsforth (GB)

(73) Assignee: Hoerbiger Ventilwerke GmbH, Vienna (AT)

(*) Notice: Subject to any disclaimer, the term of this patent is extended or adjusted under 35 U.S.C. 154(b) by 41 days.

(21) Appl. No.: 09/704,562

(22) Filed: Nov. 3, 2000

(30) Foreign Application Priority Data

Apr. 10, 2000 (AT) .......................................... 603/2000

(51) Int. Cl.[7] .................................................. F16J 9/12
(52) U.S. Cl. ........................ 277/489; 277/459; 277/460; 277/434; 277/544
(58) Field of Search ................................. 277/411, 434, 277/435, 446, 544, 483, 486, 489, 459, 460

(56) References Cited

U.S. PATENT DOCUMENTS

| 1,008,655 A | | 11/1911 | Lewis et al. | |
|---|---|---|---|---|
| 1,251,630 A | * | 1/1918 | Brandum | 277/446 |
| 1,293,617 A | * | 2/1919 | Obertop | 277/483 |
| 2,047,590 A | * | 7/1936 | Madsen | 277/489 |
| 2,055,153 A | * | 9/1936 | Madsen | 277/486 |
| 3,271,037 A | * | 9/1966 | Hammond | 277/544 |
| 3,305,241 A | | 2/1967 | Hart | |
| 3,575,424 A | * | 4/1971 | Taschenberg | 277/411 |
| 3,711,104 A | | 1/1973 | Henry | |
| 6,045,135 A | * | 4/2000 | Feistel | 277/434 |
| 6,322,080 B1 | * | 11/2001 | Feistel | 277/435 |

* cited by examiner

*Primary Examiner*—Anthony Knight
*Assistant Examiner*—Enoch E Peavey
(74) *Attorney, Agent, or Firm*—Dykema Gossett PLLC

(57) ABSTRACT

Two axially abutting individual rings (4, 5) arranged in a shared casing recess (3) at the passage (6) of a component (2) to be sealed, which each is formed of several ring segments (4', 5') pressed against the component (2) to be sealed by a common peripheral spring (8). The cover ring (4) facing the side (6) to be sealed is radially divided and relieved from pressure by inlet-side radial grooves (7). The actual sealing ring (5) is divided by essentially tangential sections. To reduce wear and heat transfer, the cover ring (4) exhibits a circumferential carrying shoulder (9) on the side facing the sealing ring (5), on which sits the sealing ring (5) with the circumferential peripheral surface (10) of a twist-out section (11). In addition, the pressure on the cover ring (4) is largely relieved by an inner peripheral groove (12) that is provided on the side of the carrying shoulder (9) and in contact with the delivery side (6).

5 Claims, 2 Drawing Sheets

SEALING RING COMBINATION

BACKGROUND OF THE INVENTION

1. Field of the Invention

The invention relates to a sealing ring combination, in particular for sealing a cylinder passage of a reciprocating piston rod of a reciprocating compressor, including two axially abutting individual rings arranged in a shared casing recess at the passage of a component to be sealed, which each are formed of several ring segments pressed against the component to be sealed by a common peripheral spring, and wherein the cover ring facing the side to be sealed is radially divided and relieved from pressure by inlet-side radial grooves, and the actual sealing ring is divided by essentially tangential sections.

2. The Prior Art

Such sealing ring combinations or sealing ring pairs are used as high-performance pressure seal, e.g., for the mentioned piston rod at the passage through the cylinder floor of a reciprocating compressor. In one such arrangement that has become known as the "BT ring", the first ring facing the component to be sealed is also called the cover ring, radially divided into three sections, wherein the first segments are held together by a superposed peripheral spring, and hence the ring as a whole is kept in contact with the piston rod. Radial grooves on the inlet side allow the inlet pressure in the entire peripheral space to act outside the two rings, so that the second, actual sealing ring, which is divided into three essentially tangential sections, is still exposed to a sealing pressure from outside, and pressed against the component to be sealed. Due to its radial division, the cover ring on the inlet side cannot become significantly further worn by the reciprocating component after an initial run-in phase and closing of the dividing gap. However, the sealing ring continues to be pressed directly against the component to be sealed by the inlet pressure and applied peripheral spring even after run-in due to the tangential division, and hence becomes further worn, which also results in a significant temperature load owing to the frictional heat.

The object of the present invention is to provide an improved sealing ring combination of the kind mentioned at the outset or discussed as prior art in such a way as to avoid the cited disadvantages to known device of this kind, and in particular to provide an improved long-term sealing effect at a reduced heat load.

SUMMARY OF THE INVENTION

According to the present invention, this object is achieved in a device of the type mentioned at the outset by having the cover ring exhibit a circumferential carrying shoulder on the side facing the sealing ring, on which sits the sealing ring with the circumferential peripheral surface of a twist-out section facing the cover ring, and by largely relieving the pressure on the cover ring by means of an inner peripheral groove that is provided on the side of the carrying shoulder and in contact with the delivery side. Due to the carrying shoulder on the cover ring or the interaction of the latter with the circumferential peripheral surface of the twist-out section of the sealing ring, the latter can only wear to a limited or controlled extent during the run-in phase on its inside periphery closing on the component to be sealed until the sealing ring is carried by this carrying shoulder. This gives rise to a very effective sealing labyrinth with an annular gap that is somewhat enlarged over the course of time against the component to be sealed due to the lack of applied pressure, which also blends the pressure reduction over at least several such combinations arranged in one packing in an additionally advantageous manner. Given the extensive pressure relief of the cover ring on the inlet side, the latter is no longer additionally pressed against the component to be sealed by the inlet pressure to be sealed, which reduces wear or a corresponding heat build-up.

Since the sealing ring is carried in the described manner by the circumferential carrying shoulder on the cover ring, another preferred configuration of the invention can provide that the width of the inside periphery of the sealing ring sealing on the component to be sealed be smaller, preferably by half, than the width of the cover ring. This makes it possible to further reduce the arising frictional heat, which makes such sealing ring combinations outstanding for use in sealing packings without a separate, active cooling.

In another preferred configuration of the invention, the inside periphery of the cover ring can exhibit axial, groove-like depressions from the delivery side to the inside peripheral groove, which ensure the pressure relief of the cover ring described at the outset even in the run-in state in a simple way.

The invention will now be described in greater detail by reference to the embodiments depicted in part diagrammatically in the drawings.

DETAILED DESCRIPTION OF THE PREFERRED EMBODIMENTS

Figure 1:
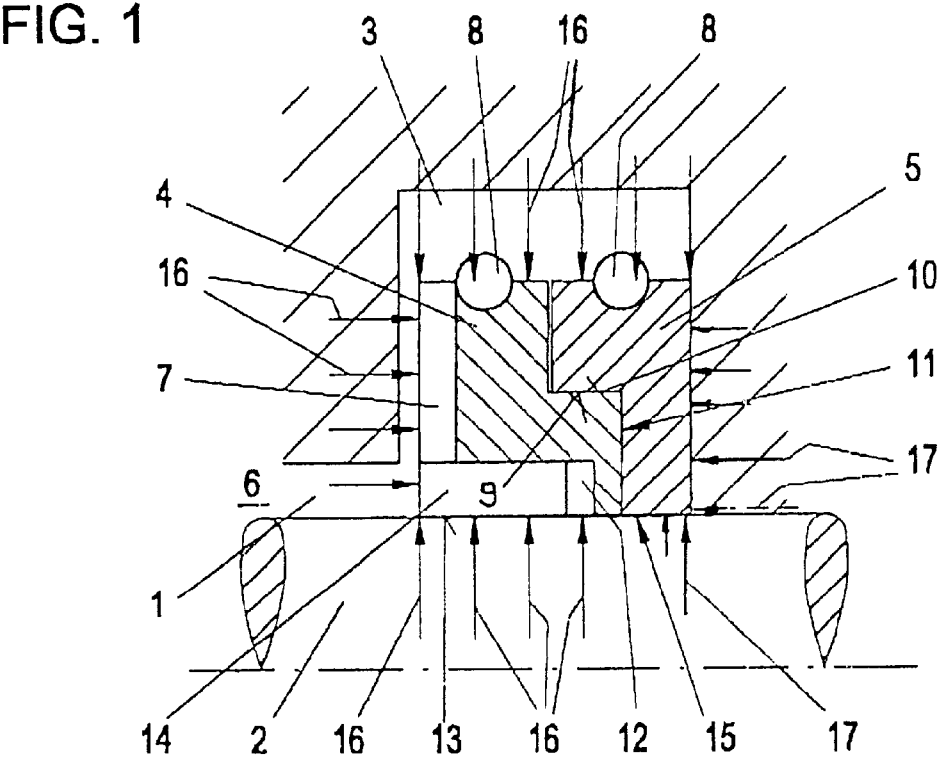
FIG. 1 shows a view through a sealing ring combination according to the invention built-in, and FIGS. 2 and 3 each show various perspective views of sealing ring combinations according to the invention.

The sealing ring combination shown in FIG. 1 is used to seal the cylinder passage 1 of the reciprocating piston rod 2 of a reciprocating compressor (not shown). Essentially two axially adjacent, individual rings 4, 5 arranged in a shared casing recess 3 at the passage 1 of the component 2 to be sealed, which each consist of several ring segments in a manner still to be discussed in FIG. 2 and 3, and of which the cover ring 4 facing the side to be sealed 6 is radially divided and relieved from pressure by inlet-side radial grooves 7, and the actual sealing ring 5 is divided by essentially tangential sections. The individual ring segments 4', 5' of each ring 4, 5 are each pressed against the component 2 to be sealed or held together by a shared peripheral spring 8.

On the side facing the sealing ring 5, the cover ring 4 exhibits a circumferential carrying shoulder 9, on which sits the sealing ring 5 with the circumferential peripheral surface 10 of a twist-out section 11 facing the cover ring 4, wherein the sealing ring 5 forms a single quasi-unit with the cover ring 4 in the run-in state, which brings about a very effective labyrinth seal. To minimize the friction-induced wear of the cover ring 4 relative to the component 2 (i.e., the piston rod in the example) as much as possible, the cover ring 4 is relieved of pressure by an inner peripheral groove 12 that is provided on the side of the carrying shoulder 9 and is in contact with the delivery side 6 to be sealed, wherein the inside periphery 13 can additionally exhibit axial, groove-like depressions 14 specially depicted in FIG. 2 and 3 running from the delivery side 6 to the inside peripheral groove 12, which ensure the pressure relief of the cover ring 4 described at the outset even in the run-in state.

The width of the inside periphery 15 of the sealing ring 5 sealed on the component 2 to be sealed here measures half the width of the cover ring 4, which on the one hand signifies a rapid run-in and less generated frictional heat, but on the other hand cannot result in any stability problems in view of the sealing ring 5 sitting on the shoulder 9 of the cover ring 4.

Also evident from FIG. 1 is that the pressure of the side 6 to be sealed (symbolized by continuous arrows 16) acts uniformly on the radial face of the cover ring 4, on the outside peripheries of cover ring 4 and sealing ring 5, and on the largest part of the inside periphery of the cover ring 4. The pressure reduction on the outside or subsequent pressure (symbolized by dashed arrows 17) takes place along the back radial face of the sealing ring 5 (against the corresponding wall of the casing recess 3), and along the inside periphery 15 of the sealing ring 5 (interacting with the piston rod 2 to be sealed). Since in particular the latter pressure reduction segment is short and the sealing ring 5 is also no longer pressed against the component 2 to be sealed by the inlet pressure or peripheral spring 8 after placed on the carrying shoulder 9, the pressure reduction can be spread uniformly over all ring pairs given several consecutively arranged, identical sealing ring combinations.

Figure 2:
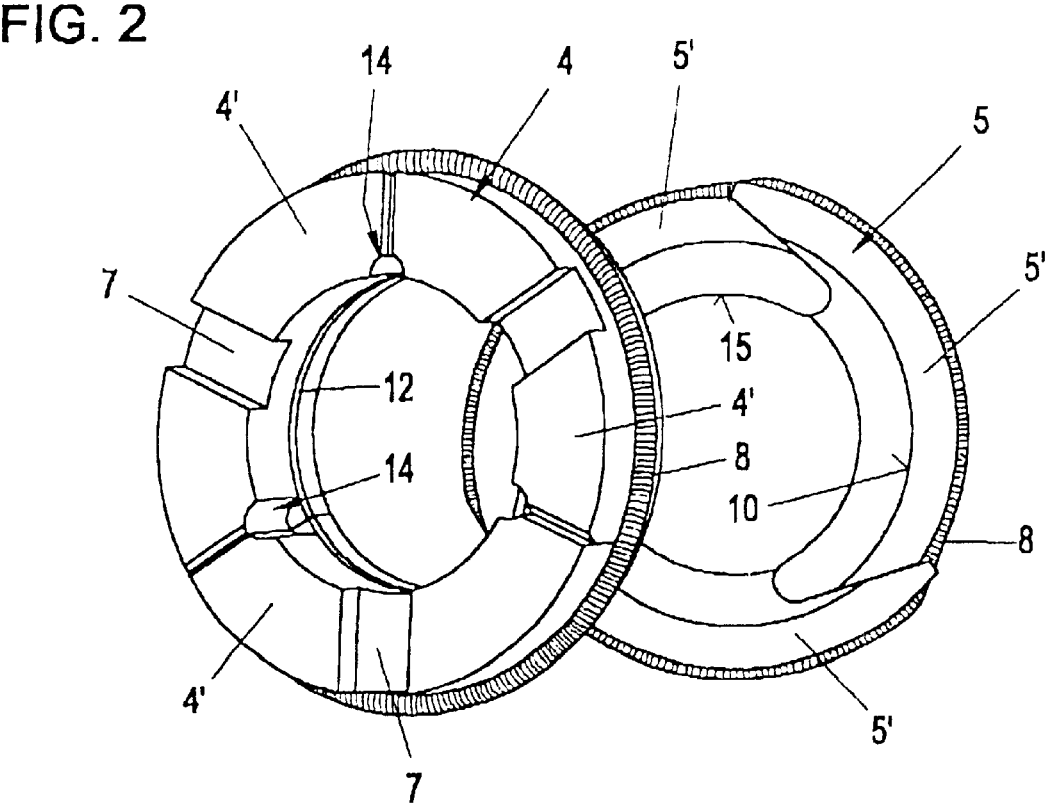
Figure 3:
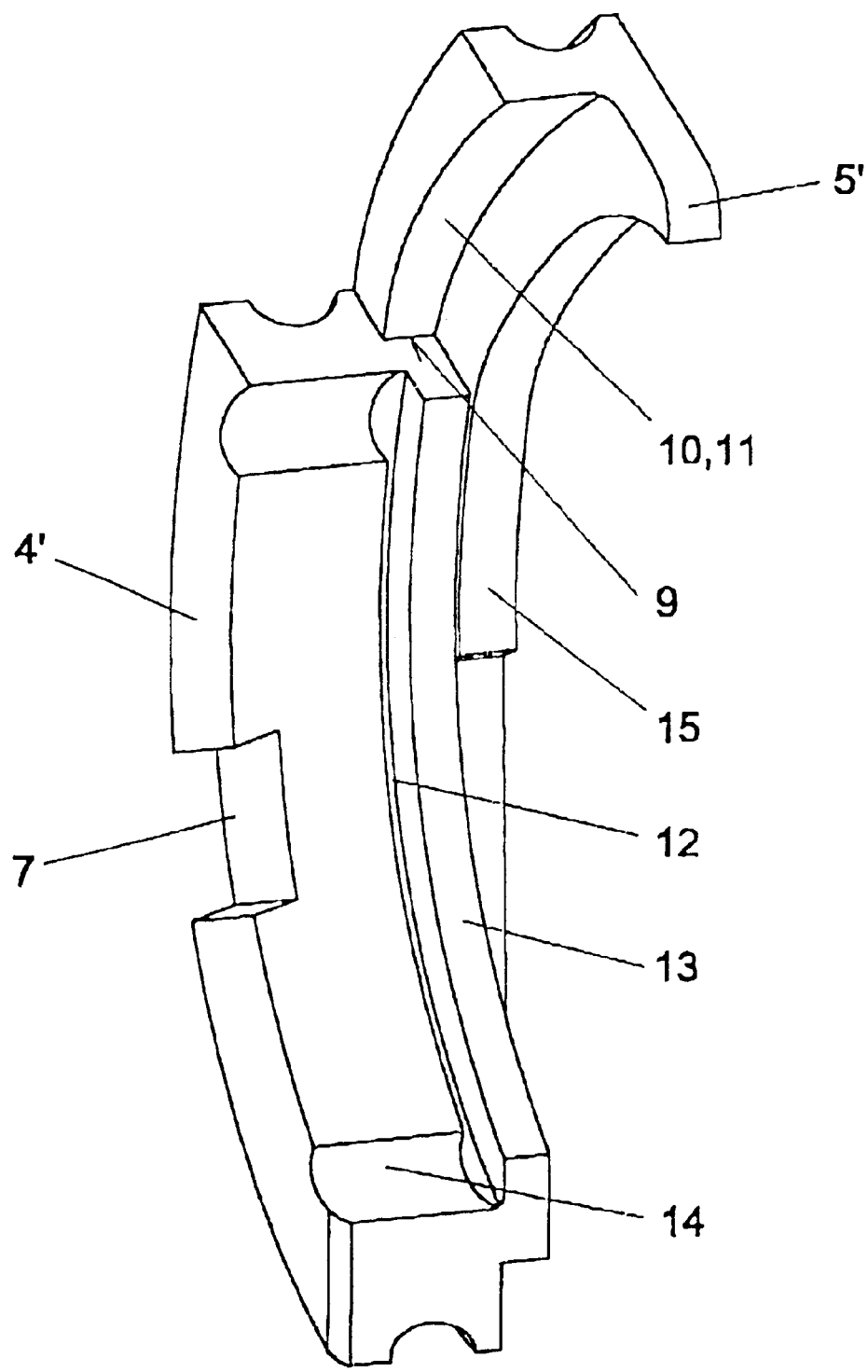

FIG. 2 shows the cover ring 4 and sealing ring 5, each consisting of three ring segments 4' and 5', with applied peripheral springs 8. Particularly evident in FIG. 3 is the radial division of the cover ring 4 in the area of the inside, groove-like depressions 14, along with the peripheral groove 12 arranged on the inside periphery of cover ring 4 for the described pressure relief. The inlet-side radial grooves 7 of the cover ring 4 ensure the pressure-relieved state depicted in FIG. 1, even in cases where the inlet-side face of the cover ring 4 lies against the allocated radial casing wall of the casing recess 3.

Also evident from FIGS. 2 and 3 is the tangential division of the sealing ring 5, which hence can also continue to wear incrementally on the inside periphery 15 relative to the component 2 to be sealed after the initial run-in, since stoppage by the respectively adjacent annular segment 5' is planned for much later than for the radially divided cover ring 4.

The depicted and discussed sealing ring combination with the described pressures reduced by the structural designs yields a reduced heat build-up in the packing relative to the component to be sealed. Reducing the force gives rise to some leakiness on the individual sealing ring pair at higher pressures. On the other hand, however, this advantageously results in a continuous pressure reduction over the entire packing length with several such sealing rings.

I claim:

1. The combination of a cover ring and a sealing ring for positioning in axially abutting relation in a recess of a casing and around a reciprocating piston rod which extends through said recess, wherein said cover ring is formed of a plurality of radially-abutting cover ring segments and which in cross section defines a front portion defining an outer circumferential surface having a first outer diameter and a rear portion having an outer circumferential shoulder having a second outer diameter, said second outer diameter being less than said first outer diameter such that said cover ring has a generally L-shaped cross section, said cover ring defining a front face having a plurality of circumferentially-spaced radial channels therein and an inner circumferential surface having a circumferential groove therein which communicates with said front face, said sealing ring is formed of a plurality of tangentially abutting sealing ring segments and which in cross section defines a front portion having an inner circumferential surface which is positioned on said outer circumferential shoulder of said rear portion of said cover ring, and a rear portion, said front portion and said rear portion of said sealing ring providing said sealing ring with an inverted and reversed generally L-shaped cross section, and a common peripheral spring around said cover ring and said sealing ring to press said cover ring and said sealing ring against said reciprocating piston rod.

2. A combination according to claim 1, wherein said rear portion of said sealing ring has an inner circumferential surface whose axial width is less than an axial width of said inner circumferential surface of said cover ring.

3. A combination according to claim 2, wherein the axial width of the inner circumferential surface of said rear portion of said sealing ring is one half the axial width of the inner circumferential surface of said cover ring.

4. A combination according to claim 2, wherein said cover ring includes a plurality of circumferentially spaced axial channels which extend from said front face to said circumferential groove in said inner circumferential surface.

5. A combination according to claim 1, wherein said cover ring includes a plurality of circumferentially spaced axial channels which extend from said front face to said circumferential groove in said inner circumferential surface.

* * * * *